US009121440B2

(12) United States Patent
Eichler et al.

(10) Patent No.: US 9,121,440 B2
(45) Date of Patent: Sep. 1, 2015

(54) TRANSFER SUCTION ROLL FOR TRANSFER OF A MATERIAL WEB

(71) Applicant: Andritz AG, Graz (AT)

(72) Inventors: Helmut Eichler, Graz (AT); Harald Weigant, Stattegg (AT); Michael Janosch, Jennersdorf (AT)

(73) Assignee: Andritz AG, Graz (AT)

( * ) Notice: Subject to any disclaimer, the term of this patent is extended or adjusted under 35 U.S.C. 154(b) by 386 days.

(21) Appl. No.: 13/648,401

(22) Filed: Oct. 10, 2012

(65) Prior Publication Data

US 2013/0095989 A1    Apr. 18, 2013

(30) Foreign Application Priority Data

Oct. 12, 2011    (AT) ................. A 1479/2011

(51) Int. Cl.
*F16C 13/00* (2006.01)
*D21F 3/10* (2006.01)
*D21F 2/00* (2006.01)

(52) U.S. Cl.
CPC . *F16C 13/00* (2013.01); *D21F 2/00* (2013.01); *D21F 3/10* (2013.01)

(58) Field of Classification Search
CPC ............. F16C 13/00; D21F 3/10; D21F 2/00
USPC ................................................. 492/15, 20, 32
See application file for complete search history.

(56) References Cited

U.S. PATENT DOCUMENTS 3,828,410 A * 8/1974 Zeiffer .......................... 492/32
7,758,727 B2 * 7/2010 Beuther et al. ............. 162/358.1

FOREIGN PATENT DOCUMENTS

DE    19600880 A1 * 7/1997 ................ D21F 2/00
DE    19728823 A1 * 1/1999 ................ D21F 1/48

OTHER PUBLICATIONS

English Machine Translation of DE 19600880 A1, (Jul. 1997).*
English Machine Translation of DE 19728823 A1, (Jan. 1999).*

* cited by examiner

*Primary Examiner* — Sarang Afzali
(74) *Attorney, Agent, or Firm* — Alix, Yale & Rista, LLP

(57) ABSTRACT

The subject of this invention is a transfer suction roll (21) for transferring a material web with a perforated suction roll shell (22) that is pivot-mounted in roller bearings (25) and a suction box (24) mounted inside the transfer suction roll (21). The suction box (24) defines a suction zone (37) on the perforated suction roll shell (22) by means of seals (32). According to the invention, a suction hood (26) is arranged on the outer circumference of the transfer suction roll (21) through which air can be sucked out of the suction box (24) through the perforated suction roll shell (22).

14 Claims, 4 Drawing Sheets

TRANSFER SUCTION ROLL FOR TRANSFER OF A MATERIAL WEB

BACKGROUND

The subject of this invention is a transfer suction roll for transferring a material web from one machine section to a subsequent machine section. The transfer suction roll consists of a perforated suction roll shell that is pivot-mounted in roller bearings and a suction box mounted inside the transfer suction roll. The suction box is open along one longitudinal side facing the suction roll shell and defines a suction zone on the perforated suction roll shell by means of seals.

Transfer suction rolls are used to transfer a material web from one machine section to the next. In paper and board machines, transfer suction rolls are used, for example, to transfer the web from the wire section to the press section and from the press section to the dryer section. If there are several presses, transfer suction rolls are also used inside the press section.

In order to be transferred, the material web is taken from one machine section via a perforated roll shell by means of negative pressure in the transfer suction roll, held on the roll shell, and transferred to the next machine section at the end of the negative pressure zone. The zones to which suction is applied with negative pressure are the so-called suction zones. There are transfer suction rolls with one or several suction zones.

FIGS. 1 to 3 show a conventional transfer suction roll 1. FIG. 1 contains a longitudinal section and FIG. 2 a cross-section through a conventional transfer suction roll 1. It generally consists of a rotating, perforated roll shell 2 with hollow journals screwed to either side. The roller bearing assemblies 5 with the bearing housings 8 are provided on either side of the transfer suction roll 1. The fixed bearing housings 8 are bolted to the machine frame. There is a stationary suction box 4 inside the transfer suction roll 1. The suction box 4 has at least one vacuum connection 6 for the required negative pressure and holds the seals 13 in the suction zone 12 towards the zone without suction on the roll circumference. During operation, the material web 17 is wrapped round the suction roll shell 2 in the area of the suction zone 12.

The suction box 4 is swivel-mounted on both sides in the outer bearing covers 7. With a slewing gear comprising a worm gear 9 and a worm wheel 10, the entire suction box 4 can be rotated round its own axis. In this way, the position of the suction zone 12 can be adapted to the operating conditions.

The embodiment with vacuum-assisted suction box 4 has large cross-sections because of the air volumes to be discharged and thus correspondingly large and expensive (mainly forged) hollow journals 3. The roller bearings 5 of conventional transfer suction rolls 1 therefore have a correspondingly large diameter and are expensive as a result. In addition to the drilled suction roll shell 2, the hollow journals 3 and roller bearings 5 are the most time-critical components (long procurement times).

The sealing arrangement 13 in conventional suction zones 12 usually contains sealing strips 14 made of plastic (FIG. 3). The sealing strips 14 are supported movably in guide strips 15 and are pressed against the inner wall of the perforated roll shell 2 by means of inflatable compressed air hoses 16 made of elastomer material in order to guarantee the sealing effect. The hoses 16 must be supplied with compressed air from the outside.

In order to reduce wear, the sealing strips 14 are lubricated by water showers 11 (FIG. 2). The water showers 11 are secured to the suction box 4 and must be supplied with water from the outside. After some time, the sealing strips 14 are worn and must be replaced.

The adjusting device for the suction zone 12 with a worm gear 9, 10 is a complicated design and thus involves corresponding costs (worm gear 9, 10 worm gear wheel 10, bearings, . . . ).

SUMMARY

The aim of the invention is to simplify the structure of the transfer suction roll and thus reduce costs compared to a conventional transfer suction roll. The number of parts fitted is to be reduced.

This task is achieved according to the invention, by a suction hood arranged on the outer circumference of the transfer suction roll by which air can be sucked out of the suction box through the perforated suction roll shell.

The negative pressure required to apply suction is thus not generated through a vacuum connection at the suction box, but through the suction hood mounted on the outer circumference of the transfer suction roll. The air is extracted through the roll shell by means of the suction hood, thus creating the negative pressure in the roll.

As the suction to generate negative pressure is applied via an external hood and no vacuum connection is provided on the suction box, there is no need for the forged hollow journals with correspondingly large diameters that are customary on conventional transfer suction rolls. The suction box is designed as a non-rotating component. It is favorable if the suction box is swivel-mounted at both ends via a holding fixture in the machine frame such that the position of the suction zone on the suction roll shell can be altered by swiveling the suction box. This makes it particularly easy to set the position of the suction zone. The design of the suction box is greatly simplified and thus cheaper compared to the suction box of a conventional transfer suction roll.

It is advantageous to operate the swivel movement of the suction box by means of an adjusting lever and adjusting screws. Thus, there is no need for a complicated slewing gear.

It is also advantageous if the perforated suction roll shell has end covers into which the roller bearings for the pivot mounting of the suction roll shell are integrated. As a result, there is no need for the conventional bearing housings, and the roller bearings can be dimensioned smaller.

The time-critical parts, such as journals and large roller bearings, are thus eliminated or replaced by smaller and easily available roller bearings. The only time-critical part remaining is the perforated suction roll shell. The end covers and bearings can have the same design on both sides, which reduces the number of parts and the costs.

In a favorable embodiment of the invention, the suction box seals are formed by flexible sealing strips. The flexible sealing strips are arranged preferably in longitudinal direction parallel to the roll axis and mounted in the roll with excess length.

The flexible sealing strip rests on the inside of the roll shell due to the excess length and does not need a holding down device (e.g., inflatable air hoses with an appropriate compressed air supply). After the sealing strips have been run in, the required length adjusts by itself and then functions free of wear. Due to wear-free running, there is no need for lubricating showers and the water supply that these would need (thus providing another cost saving). This design of seal is much simpler than the seal design of a conventional transfer suction roll and is thus cheaper.

It is desirable that the perforated suction roll shell has at least one end cover that has at least one hand-hole through which to gain access to the inside of the roll. Due to the hand-holes, the seals and the inside of the roll can be checked easily by removing the hand-hole covers. These hand-holes also facilitate mounting of new sealing strips. In conventional transfer suction rolls, the screw fitting between the hollow journal and the roll shell must be removed and the entire suction box pulled out of the roll. This is very complex and only possible with the appropriate tools.

BRIEF DESCRIPTION OF THE DRAWING

An embodiment example of the transfer suction roll according to the invention is described below on the basis of the following drawings.

DETAILED DESCRIPTION

Figure 1:
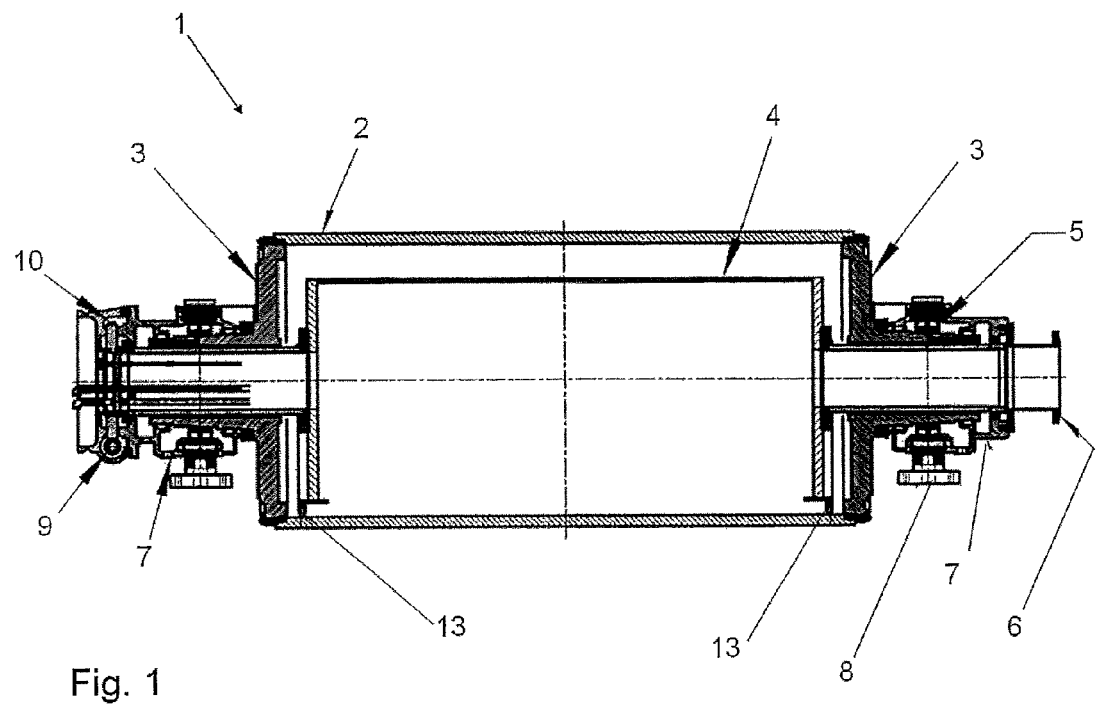
FIGS. 1 to 3 show a conventional transfer suction roll.
Figure 2:
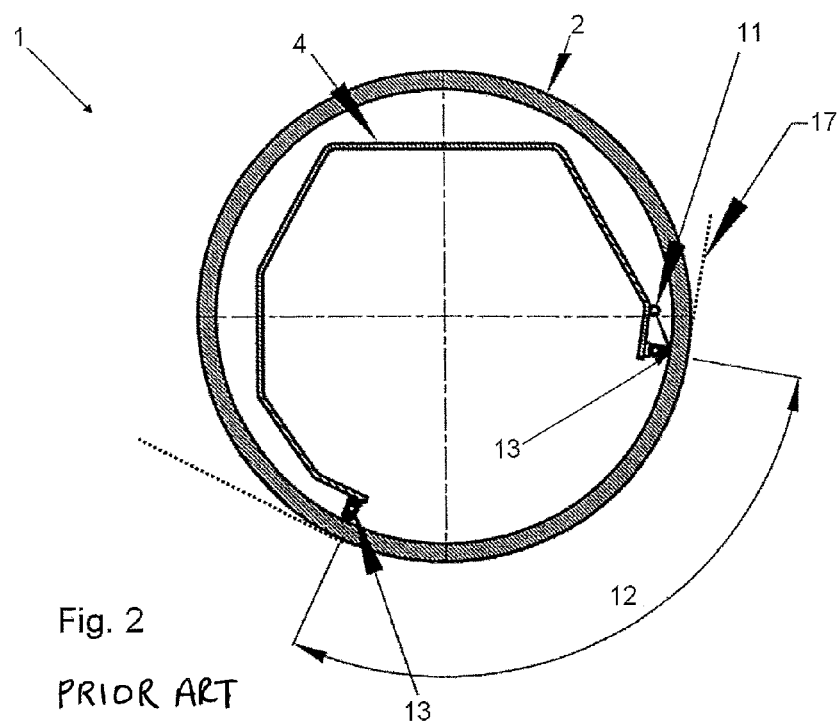
Figure 3:
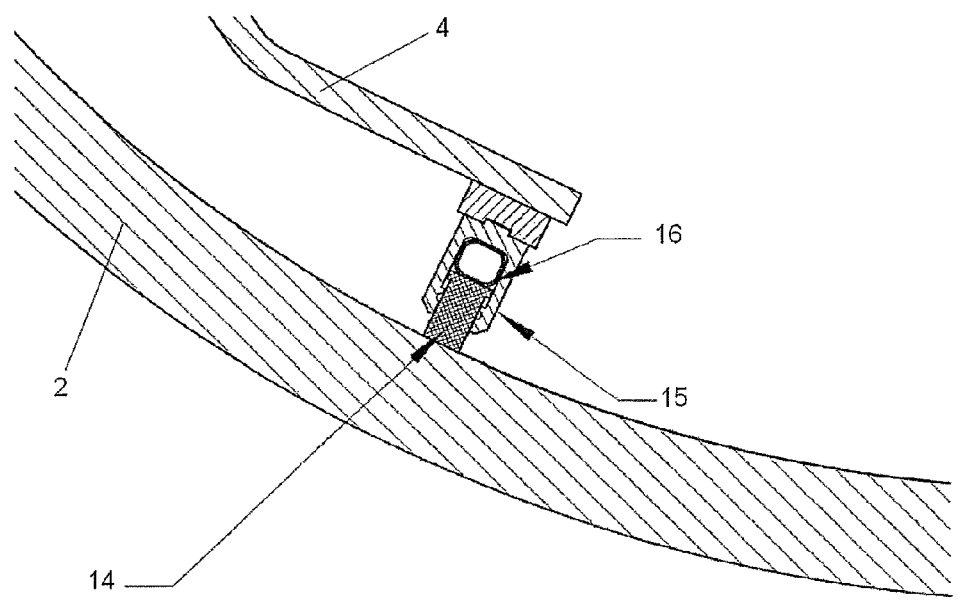
Figure 4:
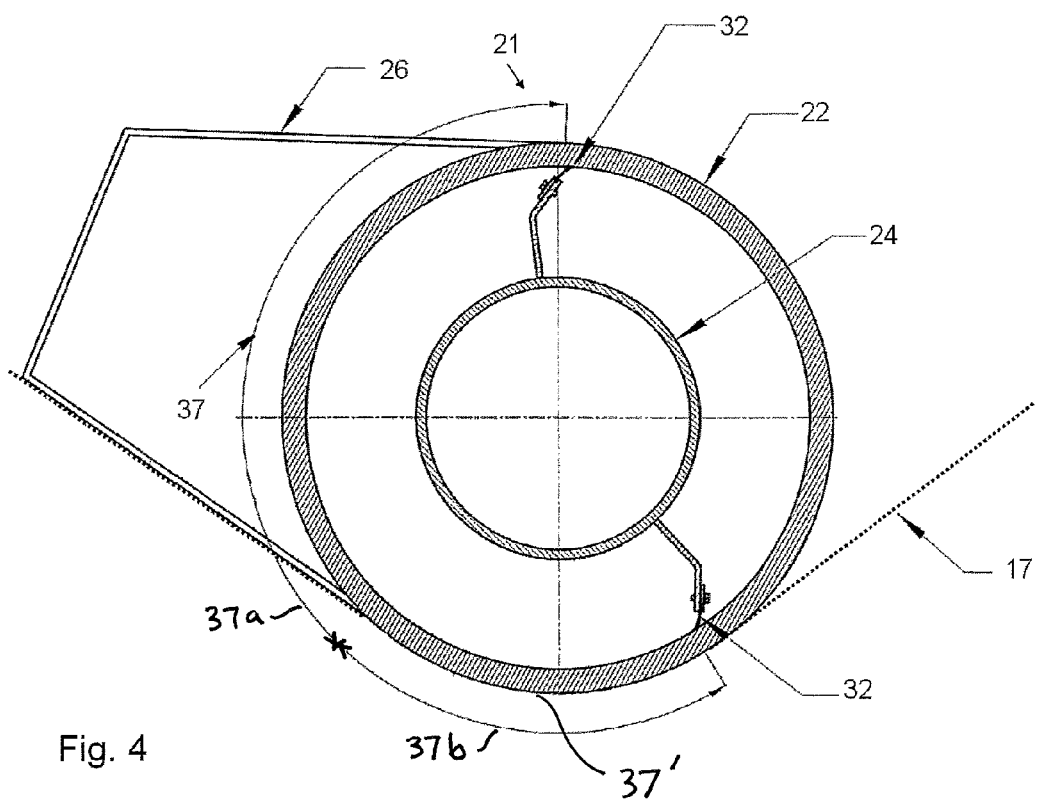
FIG. 4 shows a schematic cross-section through the transfer suction roll according to the embodiment example.

The transfer suction roll 21 according to the example embodiment of the invention is shown in FIG. 4. It largely comprises a perforated suction roll shell 22 (rotor), a stationary (non-rotating) suction box 24 inside the transfer suction roll 21, and a suction hood 26 that rests on the outside on the suction roll shell 22. The suction box 24 defines a suction zone 37 by means of the seals 32. A material web 17 can be held securely on the roll surface by the suction zone 37. The suction hood 26 is connected to a negative pressure system through a suction line. The suction hood 26 sucks air from the inside of the suction roll through the perforated suction roll shell 22, thus creating the negative pressure inside the transfer suction roll 21.

The suction hood 26 covers a smaller portion 37a of the roll surface than the portion of the roll spanned by suction zone 37. Thus a zone 37b remains on an arcuate portion of the shell between the suction hood 26 and the second seal 32 in which suction is applied to the perforated roll shell 22. This sector is the active area for transfer 37' of a material web 17. By swiveling the suction box 24 and also the suction hood 26 if necessary, the position of the zone to which suction is applied changes on the roll surface. It is preferable if the suction hood 26 touches the perforated suction roll shell 22 at a tangent at least on one side so that the material web 17 can run directly along the suction hood 26.

Figure 5:
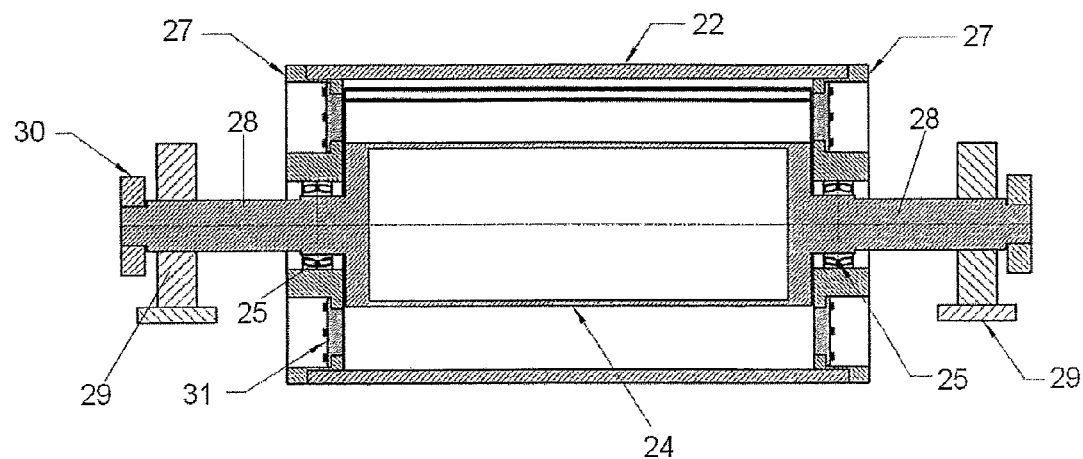
FIG. 5 shows a schematic longitudinal section through the transfer suction roll.

FIG. 5 shows the bearing assembly of the perforated suction roll shell 22. The roller bearings 25 are integrated into the end cover 27 of the suction roll shell 22. In addition, the end covers 27 have hand-holes 31 through which the inside of the roll is accessible.

The suction box 24 is swivel-mounted in the holding fixture 29 via the suction box shafts 28. The holding device 29 is connected to the machine frame. The suction box 24 is swivel-mounted via an adjusting lever 30 mounted on the suction roll shaft 28.

Figure 6:
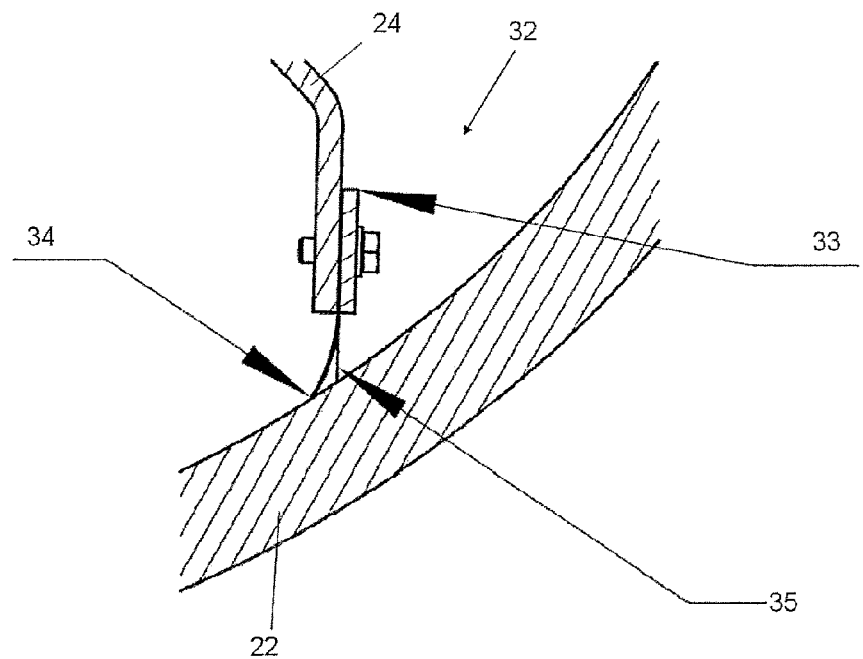
FIG. 6 shows a detailed view of the sealing arrangement between the suction box and the perforated suction roll shell.

The seal 32 of the suction box 24 opposite the perforated suction roll shell 22 is shown in FIG. 6.

The seal 32 is formed in each case by a flexible sealing strip 34, 35, which is secured, e.g. bolted or riveted, in a sealing strip fastening 33 on the suction box 24. The sealing strip 34 is installed in the sealing strip fastening 33 with excess length, thus it is curved slightly and pre-stressed against the roll shell. During the run-in phase of the transfer suction roll 21, this sealing strip 34 beds itself in to fit exactly. The final result is a sealing strip 35 that guarantees an exactly fitting seal 32 over the entire length of the roll.

Figure 7:
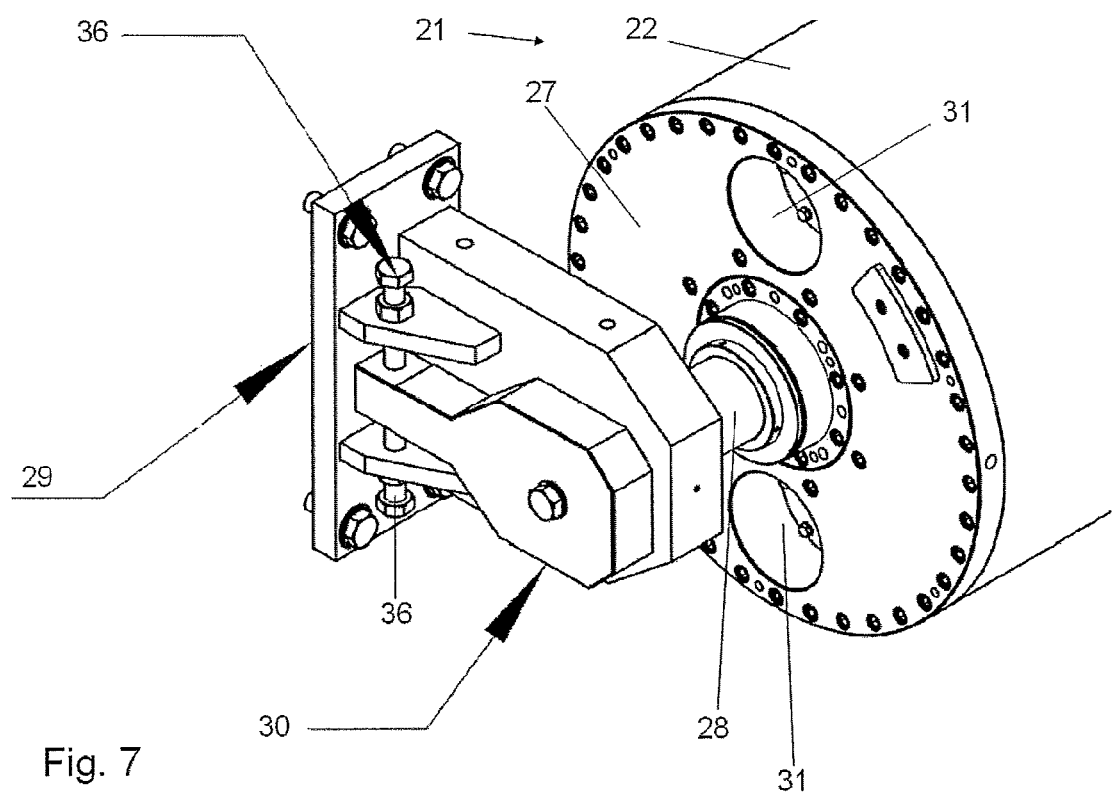
FIG. 7 shows the roll bearing assembly with the swivel mechanism for the suction box.

The bearing assembly of the suction box shafts 28 in the holding device 29 is shown in FIG. 7. The suction roll shaft 28 can be turned by means of the adjusting screws 36 and the adjusting lever 30, thus the entire suction box 24 can be swiveled. The hand-holes 31 in the end covers 27 can be used for easy changing of the seals at the transfer suction roll 21.

The invention claimed is:

1. A transfer suction roll (21) including an outer circumferential surface for transferring a material web (17) from one machine section to a subsequent machine section, comprising: a perforated suction roll shell (22) that is rotatably supported at each end by a roller bearing (25); a suction box (24) mounted inside the suction roll shell (22); spaced apart seals (32) on the suction box (24) which delineate and define a position of a suction zone (37) on the perforated suction roll shell (22); and a suction hood (26) arranged on the outer circumference of the transfer suction roll (21) by which air can be sucked out of the suction box (24) through the perforated suction roll shell (22); wherein the seals (32) of the suction box (24) are formed by flexible sealing strips (34, 35) and wherein during initial installation or replacement the flexible sealing strips (34) are cured and pre-stressed against the roll shell (22) and subject to shortening to final sealing length by grinding against the perforated suction roll shell (22) when the transfer suction roll (21) is run.

2. The transfer suction roll (21) according to claim 1, wherein the suction box (24) is a non-rotating component.

3. The transfer suction roll (21) according to claim 2, wherein the suction box (24) is swivel-mounted in a machine frame, whereby the position of the suction zone (37) on the suction roll shell (22) can be altered by swiveling the suction box (24).

4. The transfer suction roll according to claim 3, wherein the seals (32) of the suction box (24) are formed by flexible sealing strips (34, 35).

5. The transfer suction roll according to claim 4, wherein during initial installation or replacement the flexible sealing strips (34) are cured and pre-stressed against the roll shell (22) and subject to shortening to final sealing length by grinding against the perforated suction roll shell (22) when the transfer suction roll (21) is run.

6. The transfer suction roll (21) according to claim 3, wherein the swiveling of the suction box (24) is responsive to an adjusting lever (30) and adjusting screws (36).

7. The transfer suction roll according to claim 3, wherein the perforated suction roll shell (22) has end covers (27) into which the roller beatings (25) of the suction roll shell (22) are integrated.

8. The transfer suction roll (21) according to claim 1, wherein the perforated suction roll shell (22) has end covers (27) into which the roller bearings (25) of the suction roll shell (22) are integrated.

9. The transfer suction roll (21) according to claim 8, wherein the perforated suction roll shell (22) has at least one end cover (27) that has at least one hand-hole (31) through which to gain access to the inside of the roll.

10. A suction roll (21) for deflecting a moving web (17), comprising:

a perforated cylindrical suction shell (22) having an inside and an outside and axially opposite end covers (27) mounted on roller bearings (25) for supporting rotation of the shell (22);

a stationary suction box (24) mounted inside the shell (22) and defining a suction zone (37) spanning a first arcuate portion of the shell (22);

a stationary suction hood (26) resting on the outside of the shell (22) within the span of said suction zone (37) and defining a second arcuate portion (37a) of the shell, which second arcuate portion draws a vacuum in the suction box (24);

wherein a third arcuate portion (37b) of the shell adjacent the second arcuate portion (37a) of the shell and within said first arcuate portion (37), defines an active area of web transfer of the rotating shell (22) whereby the drawn vacuum in the suction box (24) acts through the perforations in the active area of the shell to draw the web toward the shell as the moving web is deflected by the active area; wherein the seals (32) of the suction box (24) are formed by flexible sealing strips (34, 35) and wherein during initial installation or replacement the flexible sealing strips (34) are cured and pre-stressed against the roll shell (22) and subject to shortening to final sealing length by grinding against the perforated suction roll shell (22) when the transfer suction roll (21) is run.

11. The suction roll (21) of claim 10, wherein the suction box includes a cylindrical central portion coaxial with the axis of the shell and two radially extending sealing arms, each carrying a seal in contact with the inside of the shell, whereby said seals delimit the suction zone.

12. The suction roll (21) of claim 11, wherein the suction box (24) has axially extending, non-rotating shafts (28);

the shell (22) has axially spaced end covers (27) that respectively surround the suction box shafts; and said roller bearings (25) are situated between the suction box shafts and the end covers.

13. The suction roll (21) of claim 12, including an adjusting lever (30) operatively connected to the suction box shaft, for adjusting the angular position of the suction box within the shell.

14. A suction roll (21) for deflecting a moving web (17), comprising:

a perforated cylindrical suction shell (22) having axially opposite end covers (27) mounted on roller bearings (25) for supporting continuous rotation of the shell (22);

a stationary suction box (24) mounted inside the shell (22), including a cylindrical central portion coaxial with the axis of the shell and sealing members (32) in contact with the inside of the shell, whereby said cylinder, sealing members and an arcuate portion of the shell define a suction zone (37) of the shell;

a stationary suction hood (26) on the outside of the shell (22), drawing a vacuum in the suction zone; and an active area of web transfer (37b) on the rotating shell (22), subject to the suction of the suction zone, through the perforations in the rotating shell to draw the web toward the shell as the moving web is deflected by the active area; wherein the seals (32) of the suction box (24) are formed by flexible sealing strips (34, 35) and wherein during initial installation or replacement the flexible sealing strips (34) are cured and pre-stressed against the roll shell (22) and subject to shortening to final sealing length by grinding against the perforated suction roll shell (22) when the transfer suction roll (21) is run.

\* \* \* \* \*